(12) United States Patent
Snyder et al.

(10) Patent No.: US 6,319,627 B1
(45) Date of Patent: Nov. 20, 2001

(54) USE OF POLYMER MESH FOR IMPROVEMENT OF SAFETY, PERFORMANCE AND ASSEMBLY OF BATTERIES

(75) Inventors: Kent Snyder, Fort Wayne, IN (US); Wei Liu, Henderson, NV (US); Zhen Yang, Newtownabbey (IL)

(73) Assignee: Valence Technology, Inc., Henderson, NV (US)

( * ) Notice: Subject to any disclaimer, the term of this patent is extended or adjusted under 35 U.S.C. 154(b) by 0 days.

(21) Appl. No.: 09/621,917

(22) Filed: Jul. 24, 2000

Related U.S. Application Data

(63) Continuation of application No. 08/883,644, filed on Jun. 26, 1997, now Pat. No. 6,168,880.

(51) Int. Cl.[7] ................................................... H01M 2/14
(52) U.S. Cl. ...................... 429/62; 429/231.95; 429/129
(58) Field of Search ........................... 429/218.1, 231.95, 429/129, 136, 142

(56) References Cited

U.S. PATENT DOCUMENTS

| 4,650,730 | * | 3/1987 | Lunquist et al. | 429/62 |
| 4,741,979 | | 5/1988 | Faust . | |
| 5,521,023 | | 5/1996 | Kejha et al. . | |
| 5,756,230 | * | 5/1998 | Gao et al. | 429/192 |
| 6,168,880 | * | 1/2001 | Snyder et al. | 429/62 |

* cited by examiner

Primary Examiner—Gabrielle Brouillette
Assistant Examiner—M. Wills
(74) Attorney, Agent, or Firm—Harness, Dickey & Pierce, P.L.C.

(57) ABSTRACT

The use of a polymer mesh made of material that melts under thermal runaway helps improve the safety of an electrochemical device. The mesh material can increase the impedance of the battery during the thermal runaway and absorb some of the heat produced.

6 Claims, 2 Drawing Sheets

US 6,319,627 B1

USE OF POLYMER MESH FOR IMPROVEMENT OF SAFETY, PERFORMANCE AND ASSEMBLY OF BATTERIES

This Application is a continuation of 08/883,644 filed Jun. 26, 1997 now U.S. Pat. No. 6,168,880.

BACKGROUND OF THE INVENTION

The present invention relates to electrochemcial devices. Electrochemical devices are typically made of thin electrode and separator layers.

An example of such an electrochemical device is described in Kejha et al U.S. Pat. No. 5,521,023. Kejha et al. describes using a sheet of perforated plastic material along with a liquid ion-conductive polymer. The ion-conductive polymer is cured to form a solid- or semi-solid-state electrolyte composite. The perforated plastic material helps maintain the separation between the electrode layers. The liquid ion-conductive polymer by itself may not sufficiently maintain the separation between the electrode layers.

Another manner of maintaining the separation between the electrode layers is to use a separator using a co-polymer/plasticizer separation layer. The co-polymer/plasticizer layer can be laminated to electrode layers. The co-polymers of the separator will mix with co-ploymers of the electrodes. Later, the plasticizer is removed and an electrolyte solution added. The electrolyte solution provides and ion-conductive path between the electrodes. The co-polymer of the separator provides a relatively constant separation distance for the separator. The co-polymer remains not significantly soluble in the electrolyte solution, so that separation of the electrodes is maintained.

It is desired to have an improved electrochemical device.

SUMMARY OF THE INVENTION

A problem with electrochemical devices is that, under some conditions, a battery runaway can occur. A runaway is a short between the electrode layers which causes the battery to heat up. The head of the thermal runaway can cause additional damage to the battery, further reducing the impedance of the battery. Avoiding such runaway problems is especially important for lithium batteries.

In the present invention, a polymer mesh material made of a material that will melt during battery runaway is used. This material can be placed in a separator layer, electrode layer, or between the battery layers. The mesh is sized so that a solid battery material can be positioned in the mesh holes.

When the mesh material melts, the internal impedance is increased and thermal energy is absorbed to cause the melting. In effect, the holes of the polymer mesh are fused shut. This is useful during thermal runaway, abuse or other elevated temperature conditions. In a preferred embodiment, the melting temperature of the mesh is less than 150° C. but more than 100° C. to allow the battery layers to be laminated under normal lamination pressures and temperatures. Possible plastic materials for the polymer mesh include polyethylene, polypropylene, polyethylene terephthalate, and various co-polymers.

In a preferred embodiment, the mesh is made of ppolypropylene, polyethylene or a polyethylene/polypropylene co-polymer.

When a co-polymer is used in the separator that is substantially non-soluble in an electrolyte material, the separation and uniformity of the electrode layers can be effectively maintained under normal conditions without a polymer mesh. Adding the polymer mesh with the desired melting point has the advantage that thermal runaway can be avoided.

Additionally, placing the polymer mesh in an electrode layer can also help prevent the thermal runaway of an electrochemical device.

BRIEF DESCRIPTION OF THE DRAWINGS

The above and other features and aspects of the present invention will become more apparent upon reading the following detailed description in conjunction with the accompanying drawings.

DETAILED DESCRIPTION OF THE PREFERRED EMBODIMENT

Figure 1:
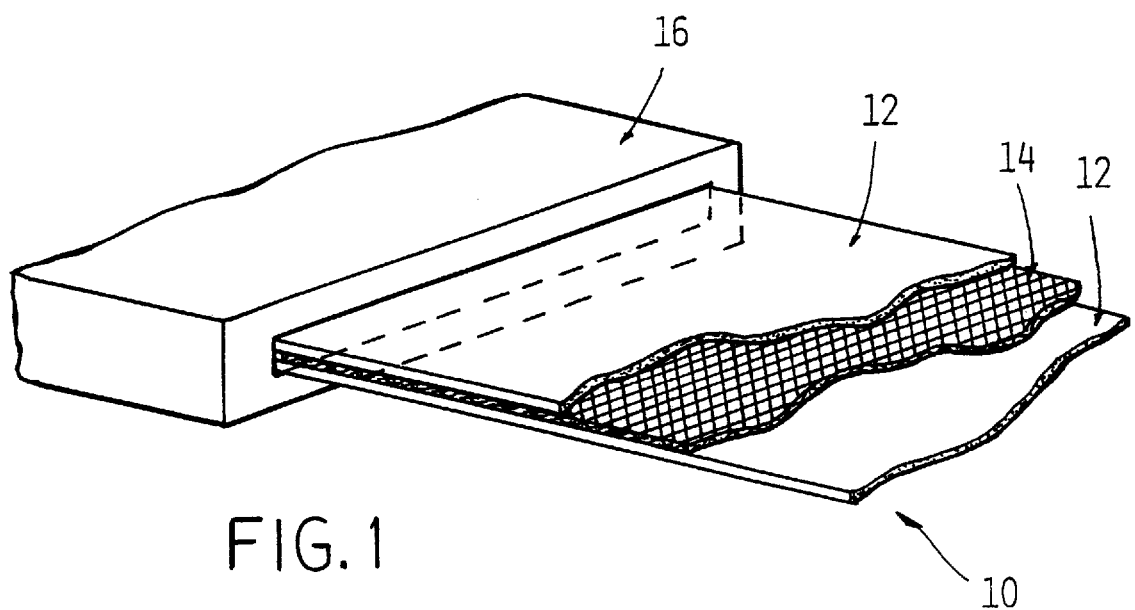
FIG. 1 is a diagram illustrating a die slot producing a mesh material within an active material layer for a battery.

FIG. 1 is a diagram illustrating the die slot production of a battery layer 10 including a battery material 12 with embedded electrically non-conductive mesh 14. In this embodiment, the battery layer 10 is extruded from the die slot 16.

In a preferred embodiment, the mesh material 14 is a plastic material. The mesh material 14 forms holes which allow the solid material 12 of the batter layer to be positioned therein. The mesh 14 is preferably expanded mesh formed by perforating and stretching a plastic layer. The mesh can also be produced by screen casting or by molding.

The mesh material is preferably made of material that melts at a temperature below 150° C. to allow for the mesh material to melt during thermal runaway of a battery. The mesh material preferably has a melting temperature above about 100° C. to allow the mesh to be used within battery layers that are laminated together. Plastic materials having a melting point in the desired range are believed to be polypropylene, polyethylene and a polyethylene/polypropylene co-polymer. In a preferred embodiment, the melting point of the mesh material is about 120–140° C.

The battery material 12 can be the separator film material used to form the separator layer, or alternatively be anode or cathode material.

Optionally, the mesh 14 can include an organic or inorganic filler material. Filler material can be used to improve the dielectric strength, change the dielectric constant and/or improve adhesion. Possible particle shape of the solid or hollow filler(s) used in the polymer mesh material include spherical, cubical, block, plate, flake or fiber. Possible filler raw materials include calcium carbonate, silica, glass, mica, alumina trihydrate, calcium metasilicate, aluminum silicate, antimony oxide, carbon or graphite, talc, barium sulfate or kaolin.

Figure 2A:
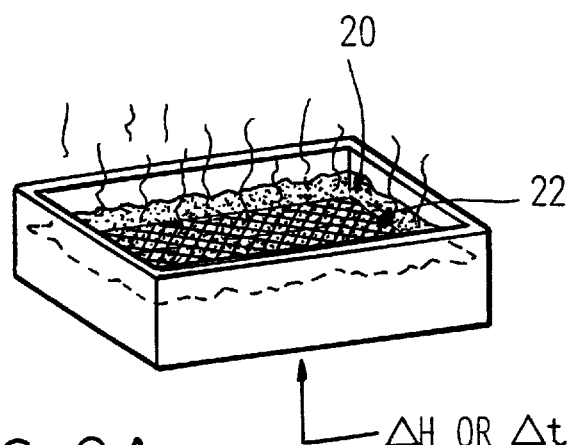
FIGS. 2A and 2B are diagrams illustrating a solvent casting of a battery layer with a mesh material that is embedded therein.
Figure 2B:
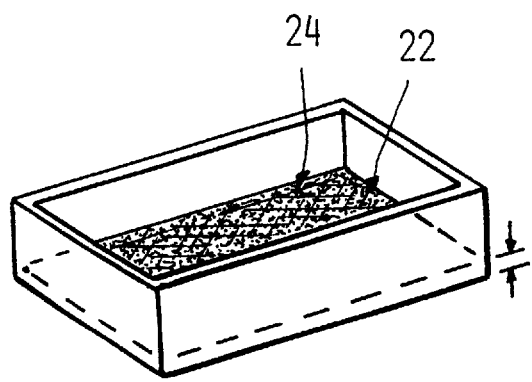

FIGS. 2A and 2B illustrate the solvent casting of a mesh 22 within a battery material 20. In FIG. 2A, the battery material 20 can be a separator layer formed with a co-polymer and an intercellular compound, such as a plasticizer. An example of a co-polymer that is not soluble in the electrolyte is polyvinylidene fluoride/hexafluoropropylene (PVDF-HFT). The plasticizer can be removed by chemical treatment, and after the application of heat or temperature in FIG. 2B, the battery material 20 reduces to a film 24. FIG. 2A and 2B illustrate the solvent casting of a separator layer, but the solvent casting could be used to produce an anode or cathode layer as well.

Figure 3:
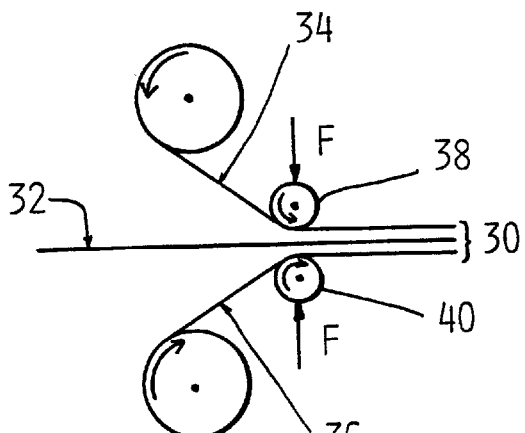
FIG. 3 is a diagram illustrating the forming of a cell from individual die layers by lamination.

FIG. 3 illustrates the lamination of a cell 30 using a separator layer 32, inner layer 34, and cathode layer 36. These layers are pressed together between rollers 38 and 40 to produce the laminated cell 30. The mesh material can be part of the separator layer 32, inner layer 34, or cathode layer 36. Alternately, the separator layer could be placed between any of these battery layers in the lamination process.

Another way to connect the battery layers to the polymer mesh is to melt or laminate the battery material to the polymer mesh. The co-polymers in the battery material will fuse with the polymer mesh.

Figure 4:
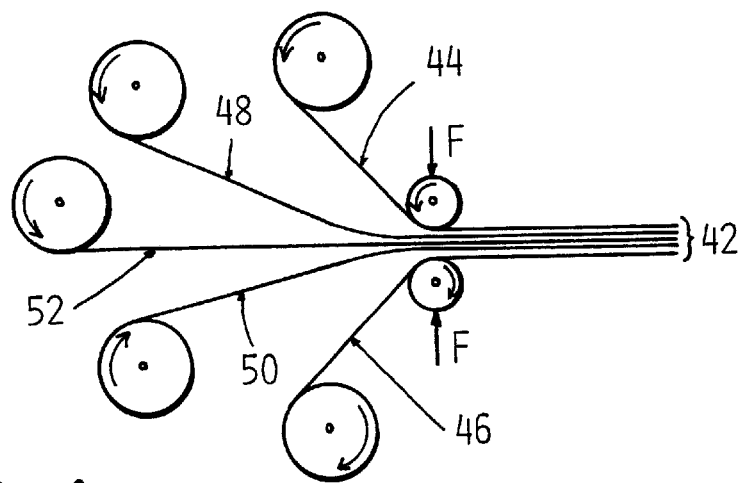
FIG. 4 is a diagram illustrating the forming of a bicell from individual battery layers.
Figure 5:
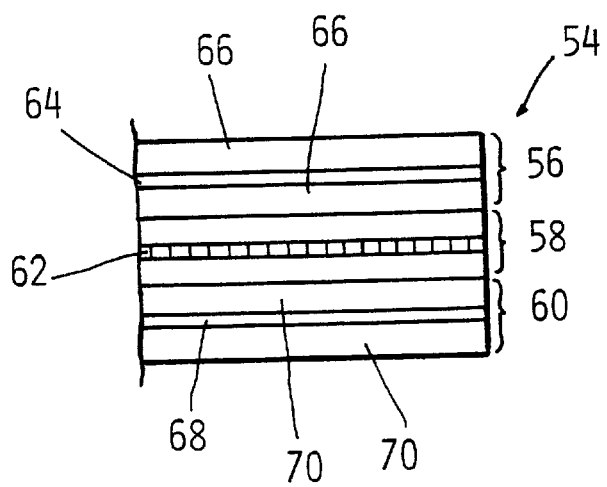
FIG. 5 is a diagram illustrating the different battery layers including the non-conductive mesh of the present invention.

FIG. 4 illustrates the production of a bicell 42 by lamination. In the production of a bicell, two cathode layers 44 and 46 are separated by separator layers 48 and 50 from a single anode layer 52. As discussed above, the mesh material can be placed within any of these layers or between any of these layers. FIG. 5 is a diagram illustrating a battery cell 54. The battery cell 54 includes an anode layer 56, separator layer 58, and cathode layer 60. The separator layer 58 includes the mesh material 62. The anode layer 56 is preferably made of a graphite-based carbon material. The anode layer 56 includes a current collector 64 and active material 66. The cathode layer 60 in a preferred embodiment is lithiated manganese oxide or lithiated cobalt oxide. The cathode 60 includes a current collector 68 and active material 70.

In a preferred embodiment, a liquid electrode material is added to the battery. The co-polymer of the separator is substantially insoluble in the electrolyte so that the co-polymer can maintain the separation between the electrodes. The polymer mesh material with the desired melting point has the advantage that the mesh will melt during thermal runaway.

Various details of the implementation and method are merely illustrative of the invention. It will be understood that various changes in such details may be within the scope of the invention, which is to be limited only by the appended claims.

What is claimed is:

1. An electrochemical device comprising:

a first electrode layer having an electrochemical material which is a first electrode material comprising a first active material mixed with first copolymers;

a separator layer having a first surface contacting the first electrode layer, said separator layer having a separator material including second copolymers, wherein said first electrode material is in direct contact with said separator material of said first surface;

a second electrode layer contacting a second surface of said separator, said second electrode layer having an electrochemical material which is a second electrode material comprising a second active material mixed with third copolymers;

polymer mesh within said separator layer, such that said polymer mesh is encompassed by said separator material, and wherein said polymer mesh comprises holes and wherein said separator material is positioned within said holes; and wherein said first and second electrode layers and said separator layer are laminated together to form a continuous path from said first copolymer to said second copolymer and then to said third copolymer, and wherein said mesh is made of a polymer material selected from the group consisting of polypropylene, polyethylene, and copolymers of polypropylene and polyethylene, with said polymer material being substantially different from said first, second and third copolymers.

2. The electrochemical device of claim 1, wherein the polymer mesh comprises an expanded mesh.

3. The electrochemical device of claim 1, wherein the polymer mesh comprises a screen material.

4. The electrochemical device of claim 1, wherein the first and third copolymers are the same.

5. The electrochemical device of claim 1, wherein the first, and second and third copolymers are the same.

6. The electrochemical device of claim 1, wherein the first, second and third copolymers are not all the same.

* * * * *